United States Patent [19]

Newill

[11] 3,882,334

[45] May 6, 1975

[54] FLUID COOLED DYNAMOELECTRIC MACHINE FRAME AND STATOR ASSEMBLY

[75] Inventor: William J. Newill, Dayton, Ohio

[73] Assignee: General Motors Corporation, Detroit, Mich.

[22] Filed: Feb. 8, 1974

[21] Appl. No.: 440,667

[52] U.S. Cl. .................................. 310/59; 310/89
[51] Int. Cl. ............................................. H02k 9/00
[58] Field of Search ............ 310/52, 53, 54, 57, 58, 310/59, 64, 65, 89, 254, 258

[56] References Cited
UNITED STATES PATENTS

| | | | |
|---|---|---|---|
| 1,342,179 | 6/1920 | Mossay | 310/57 |
| 2,334,976 | 11/1943 | Winther | 310/54 |
| 2,422,824 | 6/1947 | Clauson | 310/52 |
| 2,780,737 | 2/1957 | Labastie | 310/54 |
| 3,009,972 | 11/1961 | Mossay | 310/64 |
| 3,047,754 | 7/1962 | Jaeschke | 310/57 |
| 3,439,201 | 4/1969 | Levy | 310/52 |
| 3,567,975 | 3/1971 | Biesack | 310/57 |

*Primary Examiner*—R. Skudy
*Attorney, Agent, or Firm*—Howard N. Conkey

[57] ABSTRACT

The main frame and stator assembly of a dynamoelectric machine is described which is comprised of four cylindrical sleeves assembled one inside the other. The outer sleeve has a pair of punched holes serving as fluid inlet and outlet ports. The two sleeves between the inner and outer sleeves have punched patterns of elongated holes which overlap to form interconnecting passageways between the inlet and outlet ports. The motor stator is press fitted within the inner sleeve which provides for heat transfer between the stator and coolant within the passageways.

2 Claims, 3 Drawing Figures

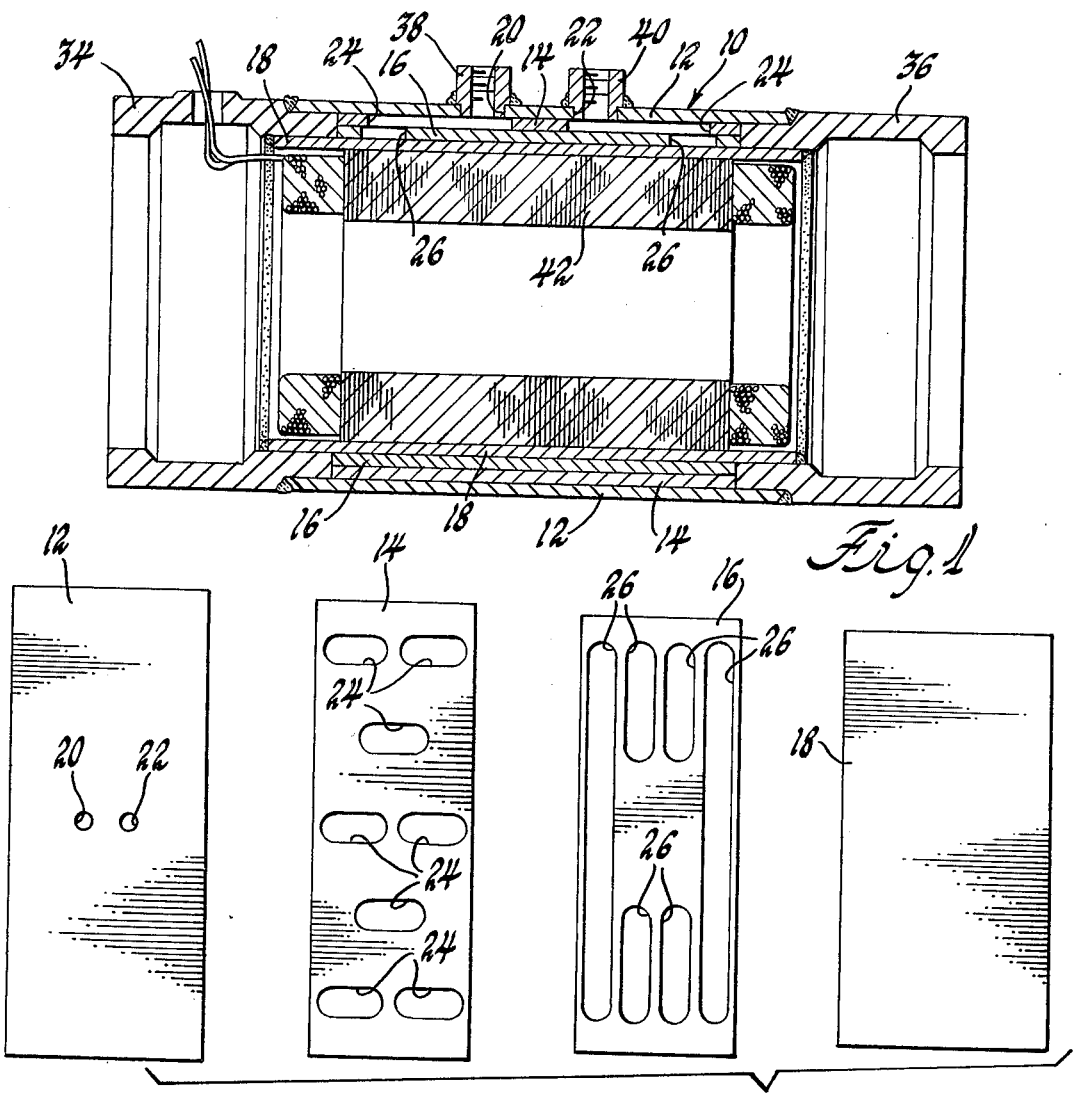
Fig. 1
Fig. 2
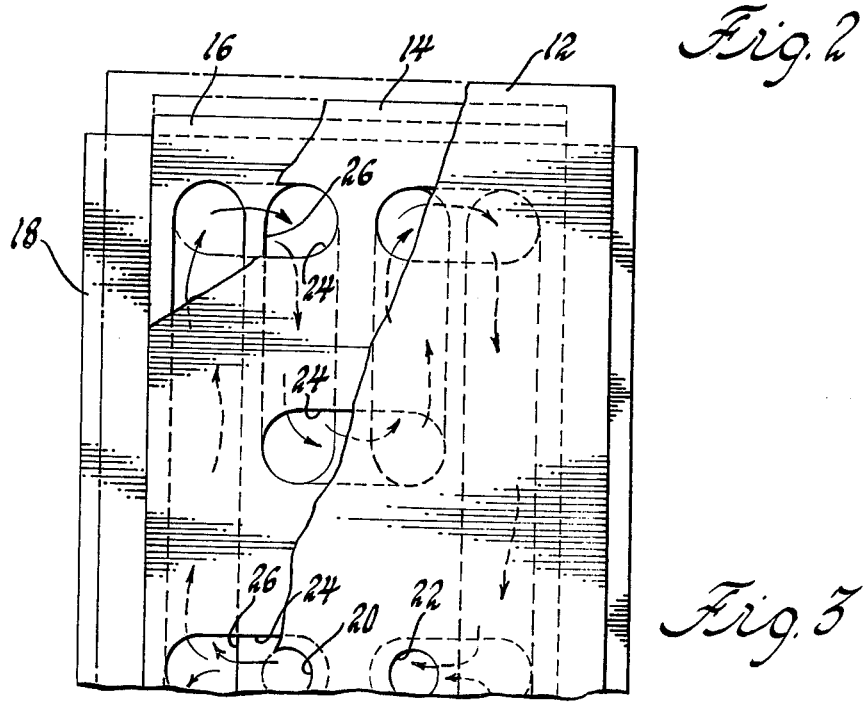
Fig. 3

FLUID COOLED DYNAMOELECTRIC MACHINE FRAME AND STATOR ASSEMBLY

This invention relates to a cooling arrangement for an electric motor. When a dynamoelectric machine is operated for extended periods under high load conditions, excessive heat can be generated. It is desirable to withdraw this heat from the dynamoelectric machine so as to increase the reliable operating life and also the efficiency and output capacity thereof. Various cooling and ventilating systems have been employed to provide for cooling which include coolant paths in the casing of the motor through which a liquid coolant is circulated to which heat generated by the motor is transferred. This form of cooling arrangement generally involves complex machining and assembly operations.

It is the general object of this invention to provide an improved cooling arrangement for a dynamoelectric machine.

It is another object of this invention to provide a frame and stator assembly of a dynamoelectric machine which is comprised of a number of cylindrical sleeves telescopically inserted one inside the other and having holes therein cooperating to form fluid passages between an inlet and outlet port to provide for cooling of the stator.

These and other objects of this invention may be best understood by reference to the following description of a preferred embodiment of the invention and the drawings in which:

FIG. 1 is a sectional view of a dynamoelectric machine frame and stator assembly including a cooling arrangement made in accordance with this invention;

FIG. 2 is a developed view of the sleeves forming the main frame of the assembly of FIG. 1; and FIG. 3 is a developed view of the sleeves of FIG. 2 superimposed to illustrate the coolant passages formed in the main frame of the assembly of FIG. 1.

Referring to the Figures, a dynamoelectric machine frame 10 is comprised of four cylindrical sleeves 12, 14, 16 and 18 which are telescopically inserted one inside the other in concentric relationship into an assembled condition as illustrated. The outer sleeve 12 has a pair of punched holes 20 and 22 which function as coolant fluid inlet and outlet ports, respectively. The sleeve 14 includes a pattern of elongated openings 24 and the sleeve 16 includes a pattern of elongated openings 26 which, when the sleeves are assembled, overlap to form interconnecting passageways defining a pair of tortuous fluid paths each beginning at the inlet port 20 and ending at the outlet port 22, one of the paths being illustrated in FIG. 3.

As seen in FIG. 3, the fluid path begins at the inlet port 20 which is connected to a passage formed by one of the elongated openings 26 by one of the openings 24 which overlaps the inlet port 20 and the elongated opening 26. This opening 26 is coupled to another one of the openings 26 by another opening 24. In this manner, the elongated openings 24 and 26 cooperated to provide a tortuous fluid path from the inlet port 20 to the outlet port 22.

The main frame 10 is completed by welding a pair of rings 34 and 36 at each end of the assembled sleeves 12 through 18. The rings 34 and 36 are welded to the outer and inner sleeves 12 and 18 and as such seals the ends of the main frame 10. It is not necessary to weld the rings 34 and 36 to the sleeves 14 and 16, as minor leakage between sleeves would not present a problem. A fitting 38 is welded to the inlet port 20 and a fitting 40 is welded to the outlet port 22 to which coolant supply and return hoses (not illustrated) are coupled to circulate liquid coolant through the path formed by the openings 24 and 26. A dynamoelectric machine stator 42 is press fitted within the inner sleeve 18. Heat from the stator 42 is transferred by the inner sleeve 18 to the coolant circulating through the frame 10 to effect cooling of the stator 42.

The inlet and outlet ports 20 and 22 and the elongated openings 24 and 26 may be formed by a simple punching process as opposed to a more complex machining process to provide for grooves in a frame through which liquid may pass.

The detailed description of the preferred embodiment of the invention for the purpose of explaining the principles thereof is not to be considered as limiting or restricting the invention, since many modifications may be made by the exercise of skill in the art without departing from the scope of the invention. For example, any number of patterns of openings may be selected and one or more coolant paths may be formed thereby.

It is claimed:

1. A cooling arrangement for a dynamoelectric machine comprising: a dynamoelectric machine frame including an inner cylindrical sleeve, a first intermediate cylindrical sleeve circumjacent the inner sleeve, a second intermediate cylindrical sleeve circumjacent the first intermediate sleeve and an outer cylindrical sleeve circumjacent the second intermediate sleeve, the outer sleeve having a fluid inlet port and a fluid outlet port, the first intermediate sleeve having a first pattern of openings therein and the second intermediate sleeve having a second pattern of openings therein overlapping respective ones of the openings in the first pattern and the inlet and outlet ports to define an interconnecting tortuous fluid path between the inlet and outlet ports; and a dynamoelectric machine stator assembled within the inner sleeve, the inner sleeve providing heat transfer between the stator and fluid circulated within the fluid path.

2. A cooling arrangement for a dynamoelectric machine comprising: a dynamoelectric machine frame including an inner cylindrical sleeve, a first intermediate sleeve circumjacent the inner sleeve, a second intermediate sleeve circumjacent the first intermediate sleeve and an outer sleeve circumjacent the second intermediate sleeve, the radius respective adjacent surfaces of the adjacent sleeves being generally equal, the outer sleeve having a fluid inlet port and a fluid outlet port, the first intermediate sleeve having a first pattern of elongated openings therein extending in a first direction and the second intermediate sleeve having a second pattern of elongated openings therein extending in a second direction substantially perpendicular to the first pattern of elongated openings and overlapping respective ones of the openings in the first pattern and the inlet and outlet ports to define at least one interconnecting tortuous fluid path between the inlet and outlet ports; means for sealing the ends of the cylindrical sleeves; and a dynamoelectric stator assembled within the inner sleeve, the inner sleeve providing heat transfer between the stator and fluid within the fluid path.

\* \* \* \* \*